(12) United States Patent
Shih et al.

(10) Patent No.: US 7,450,321 B2
(45) Date of Patent: Nov. 11, 2008

(54) LENS MODULE

(75) Inventors: Shang-Jern Shih, Hsinchu (TW);
Chih-Meng Wu, Hsinchu (TW);
Tung-Hsing Tsou, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 24 days.

(21) Appl. No.: 11/754,323

(22) Filed: May 28, 2007

(65) Prior Publication Data

US 2008/0024879 A1 Jan. 31, 2008

(30) Foreign Application Priority Data

Jul. 25, 2006 (TW) .............................. 95127072 A

(51) Int. Cl.
*G02B 15/14* (2006.01)
*G02B 7/02* (2006.01)

(52) U.S. Cl. ....................... 359/698; 359/696; 359/704; 359/824

(58) Field of Classification Search ......... 359/694–701, 359/704, 819–824
See application file for complete search history.

(56) References Cited

U.S. PATENT DOCUMENTS

| | | | |
|---|---|---|---|
| 4,992,684 A | 2/1991 | Matsui | 310/112 |
| 5,083,149 A * | 1/1992 | Kudo et al. | 396/80 |
| 5,121,016 A | 6/1992 | Wachi | 310/14 |
| 5,939,804 A | 8/1999 | Nakao et al. | 310/12 |
| 6,292,308 B1 * | 9/2001 | Tsuzuki et al. | 359/704 |
| 7,113,351 B2 * | 9/2006 | Hovanky | 359/824 |

FOREIGN PATENT DOCUMENTS

| | | |
|---|---|---|
| TW | 00225007 | 6/1994 |
| TW | 426273 | 3/2001 |
| TW | 1239432 | 9/2005 |

* cited by examiner

*Primary Examiner*—Mohammed Hasan
(74) *Attorney, Agent, or Firm*—Jianq Chyun IP Office

(57) ABSTRACT

A lens module including a guide rod set, a first lens barrel movably disposed on the guide rod set, at least one first lens disposed inside the first lens barrel, a first optical grating connected to the first lens barrel, a first position sensor, and a first voice coil motor is provided. The first position sensor and the first voice coil motor are disposed near the first lens barrel. The first position sensor has a first light-emitting device and a first photosensor opposite to each other, and the first grating is disposed between the first light-emitting device and the first photosensor. Further, a first coil unit of the first voice coil motor is connected to the first lens barrel. When a current is provided into the first coil unit, the first lens barrel is driven to move alone the guide rod set by the first coil unit.

11 Claims, 9 Drawing Sheets

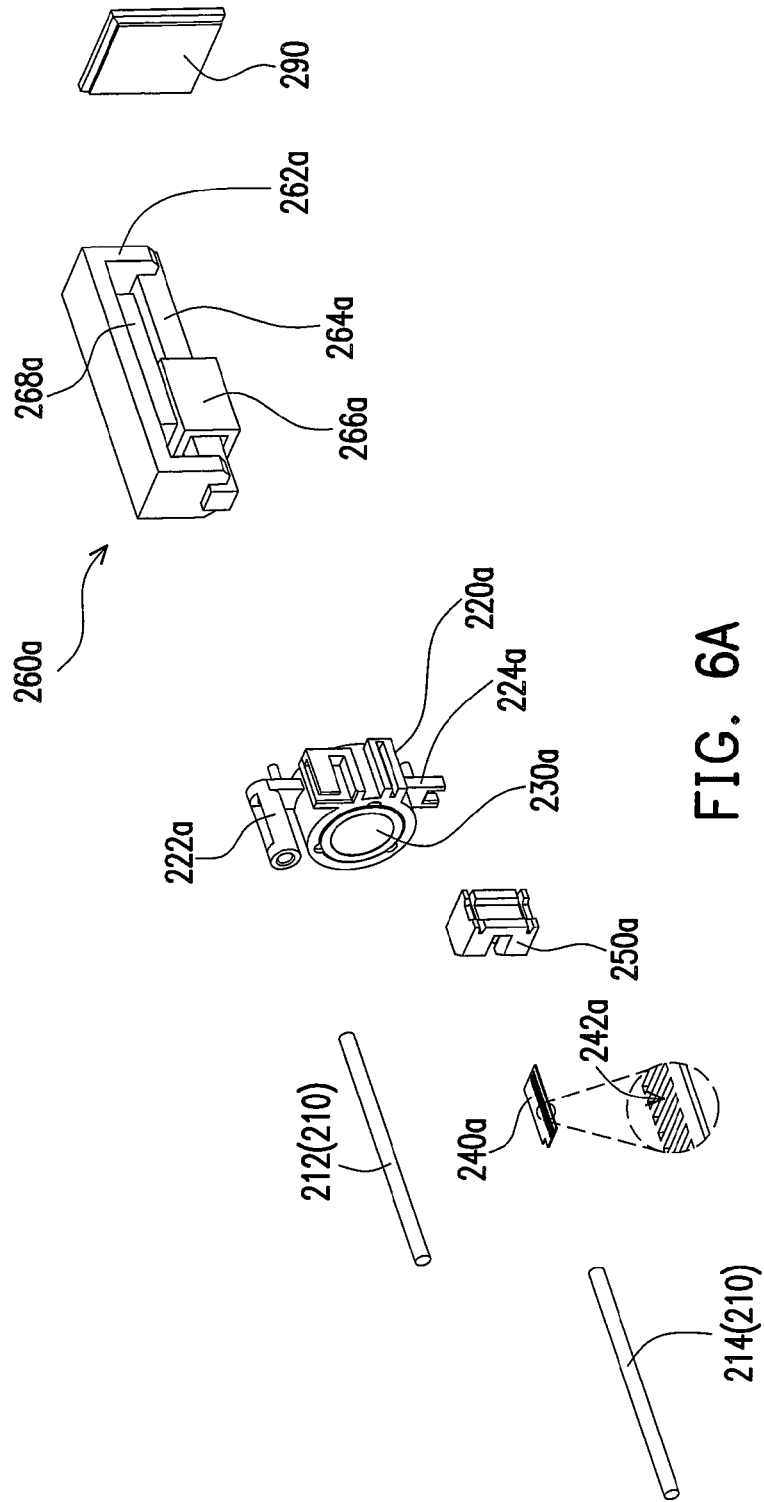
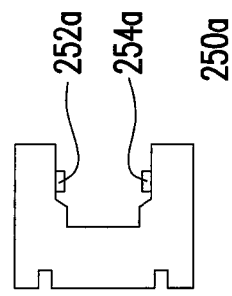
FIG. 6A
FIG. 6B

LENS MODULE

CROSS-REFERENCE TO RELATED APPLICATION

This application claims the priority benefit of Taiwan application serial no. 95127072, filed Jul. 25, 2006. All disclosure of the Taiwan application is incorporated herein by reference.

BACKGROUND OF THE INVENTION

1. Field of Invention

The present invention relates to a lens module, and more particularly to a zoom lens module.

2. Description of Related Art

FIG. 1 is a schematic view of a conventional manual focus lens module. Referring to FIG. 1, in the conventional lens module 10, a lens 110 passes through an inner ring 120, and the inner ring 120 is disposed against and between a focus ring 130 and a spring 140. Due to the focus ring 130 having segmented steps, when manually turning the focus ring 130, the inner ring 120 and the lens 110 are driven to move up and down along a Y axis, so as to achieve focusing. However, the lens module 10, due to the manual focus, is inconvenient in use.

FIG. 2 is a schematic view of a conventional lens module using a step motor to focus. Referring to FIG. 2, in the conventional lens module 20, a lens 110 passes through an inner ring 120, and the inner ring 120 is disposed against and between a focus ring 130' and a spring 140. The focusing manner of the lens module 20 involves controlling a step motor 150 to drive a transmission mechanism, e.g. a screw, a turbine, a gear, or the focus ring 130' in an electromotive manner, so that the inner ring 120 and the lens 110 are driven to move up and down along a Y axis, thereby achieving focusing. The lens module 20 can achieve an automatic focus, but has a large volume and high manufacturing cost, and is high power consuming when focusing.

FIG. 3A and FIG. 3B are schematic views of two conventional lens modules both using a voice coil motor to focus. Referring to FIG. 3A first, in the conventional lens module 30, a lens 110 passes through a magnetic conductive inner ring 160, and an force-at-a-distance is generated between magnets 170 disposed on both sides of the magnetic conductive inner ring 160 and the magnetic conductive inner ring 160 to prevent the magnetic conductive inner ring 160 moving left and right, thus fixing the position of the lens 110 on an X axis. In addition, the focusing manner of the lens module 30 involves controlling the magnitude of the current provided into a coil 180, so as to produce different magnetic levitation forces to drive the magnetic conductive inner ring 160 and the lens 110 to move along a Y axis, thereby achieving focusing.

The lens module 30 has a slow focus speed. After completing focusing, a current must be continuously provided into the coil 180 to prevent the elastic force g of the spring 140 from urging the magnetic conductive inner ring 160 moving downward, such that the position of the lens 110 can be maintained. Thus, the conventional lens module 30 is high power consuming in use. And, the position of the lens 110 on an X axis is fixed by the force-at-a-distance, so that the lens 110 tends to be inclined. Moreover, the lens module 30 cannot stand vibration or falling test.

Referring to FIG. 3B, in the conventional lens module 40, a lens 110 passes through a magnetic conductive inner ring 160', and a guide rod 185 is used to prevent the magnetic conductive inner ring 160' moving left and right, so as to fix the position of the lens 110 on an X axis. In addition, a sensor 190 is used to detect the position of the magnetic conductive inner ring 160' on a Y axis, and send a signal back to an application specific integrated circuit (ASIC) 195. The ASIC 195 drives a coil 180 in accordance with the position of the magnetic conductive inner ring 160', so as to move the magnetic conductive inner ring 160' and the lens 110 to the desired positions, thereby achieving focusing. It should be noted that after the lens module 40 completes focusing, no current is provided into the coil 180. However, the manufacturing cost thereof is high.

FIG. 4 is a schematic view of a conventional two-stage electromotive focus lens module. Referring to FIG. 4, in a lens module 50, a lens 110 passes through an inner ring 120', and a ring magnet 196 is disposed outside the inner ring 120'. The focusing manner of the lens module 50 involves changing the direction of the current provided into a coil 180 to produce an attractive force or a repulsive force between the coil 180 and the ring magnet 196, so as to drive the ring magnet 196, the inner ring 120', and the lens 110 to move along a Y axis to the top side or bottom side. In addition, as a magnetic conductive plate 197 is partially magnetized, after completing focusing and stopping providing the current into the coil 180, if the lens 110 moves to the top side, an attractive force is generated between the magnetic conductive plate 197 above and the ring magnet 196, so as to fix the lens 110 at the top side. Similarly, if the lens 110 moves to the bottom side, an attractive force is generated between the magnetic conductive plate 197 below and the ring magnet 196, so as to fix the lens 110 at the bottom side.

The lens module 50 can only switch focusing between two stages and has a large volume. Additionally, due to the high cost of the ring magnet 196, the manufacturing cost of the lens module 50 is increased accordingly.

SUMMARY OF THE INVENTION

An objective of the present invention is to provide a lens module having a function of multi-stop positioning.

In order to achieve the above or another objective, the present invention provides a lens module, which comprises a guide rod set, a first lens barrel, at least one first lens, a first optical grating, a first position sensor, and a first voice coil motor. The first lens barrel is movably disposed on the guide rod set, the first lens is disposed inside the first lens barrel, and the first optical grating is connected to the first lens barrel. The first position sensor and the first voice coil motor are disposed near the first lens barrel, wherein the first position sensor has a first light-emitting device and a first photosensor opposite to the first light-emitting device, and the first optical grating is disposed between the first light-emitting device and the first photosensor. In addition, the first voice coil motor comprises a first base, a first bar, a first coil unit, and a first magnet. The first bar is disposed on the first base, and two ends of the first bar are separated from the bottom of the first base for a distance. The first coil unit is connected to the first lens barrel, the first bar passes through the first coil unit, and the first magnet is disposed at the bottom of the first base. When a current is provided into the first coil unit, the force-at-a-distance generated between the first coil unit and the first magnet urges the first coil unit moving along the first bar, so as to drive the first lens barrel to move along the guide rod set.

The first optical grating of the present invention is connected to the first lens barrel, so when the first lens barrel moves, the first optical grating also moves accordingly. The first position sensor is used to detect the move of the first optical grating, so as to acquire the position of the first lens barrel, such that the first lens barrel can be fixed at the desired position. Therefore, the lens module of the present invention has a function of multi-stop positioning.

Other objectives, features and advantages of the present invention will be further understood from the further technology features disclosed by the embodiments of the present invention wherein there are shown and described preferred embodiments of this invention, simply by way of illustration of modes best suited to carry out the invention.

BRIEF DESCRIPTION OF THE DRAWINGS

FIG. 6A is an exploded view of the lens module of FIG. 5.

FIG. 6B is a schematic view of the first position sensor in FIG. 6A.

DESCRIPTION OF EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
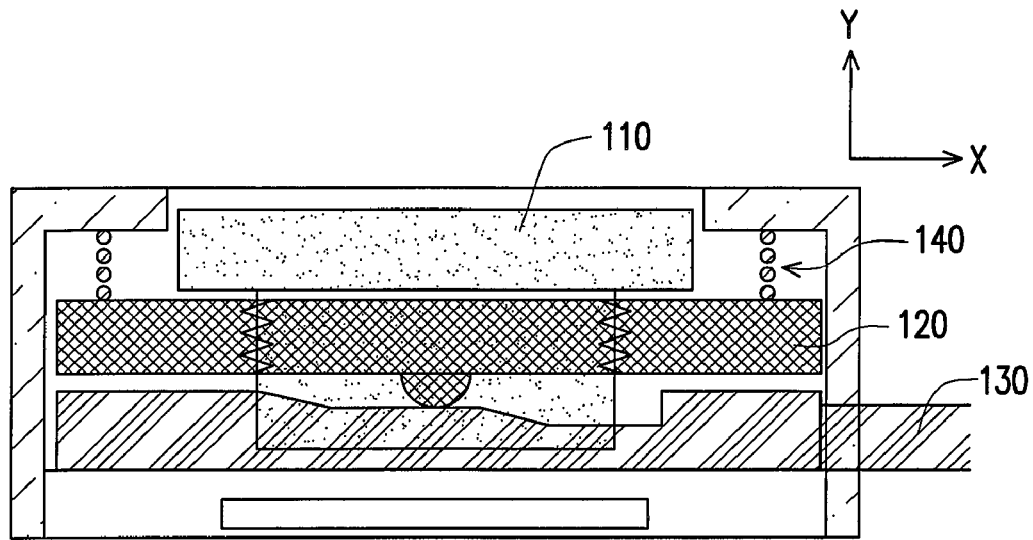
FIG. 1 is a schematic view of a conventional manual focus lens module.
Figure 2:
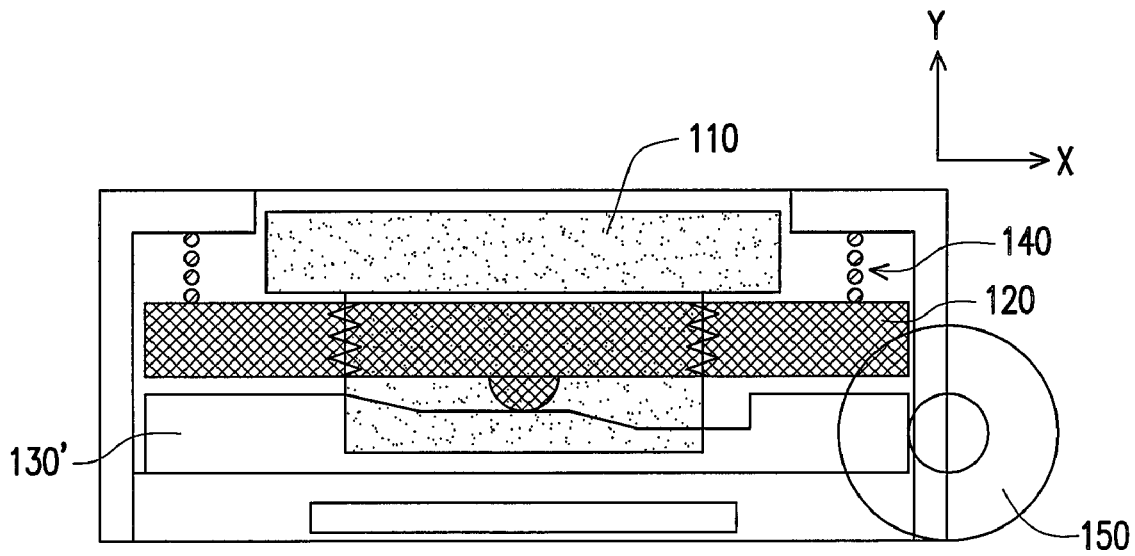
FIG. 2 is a schematic view of a conventional lens module using a step motor to focus.
Figure 3A:
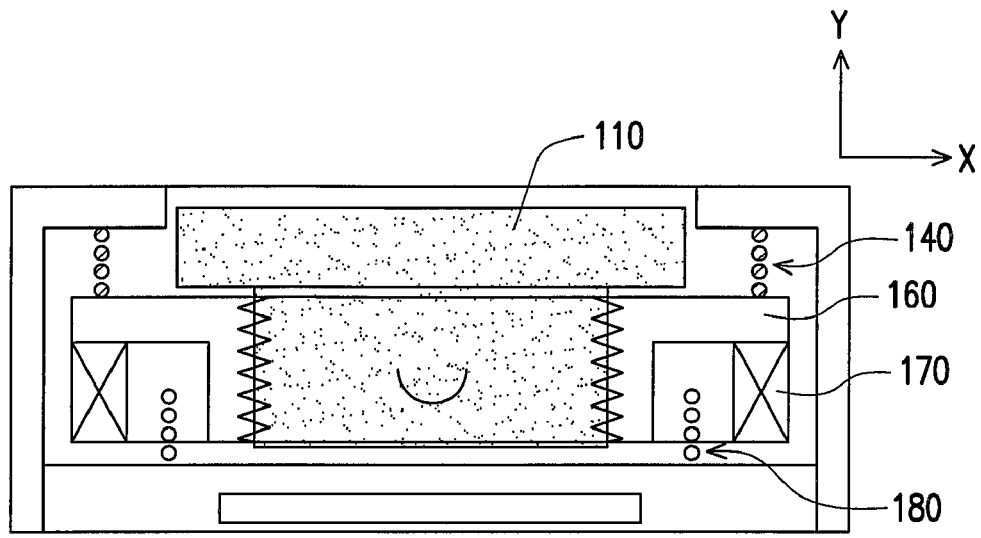
FIG. 3A and FIG. 3B are schematic views of two conventional lens modules both using a voice coil motor to focus.
Figure 3B:
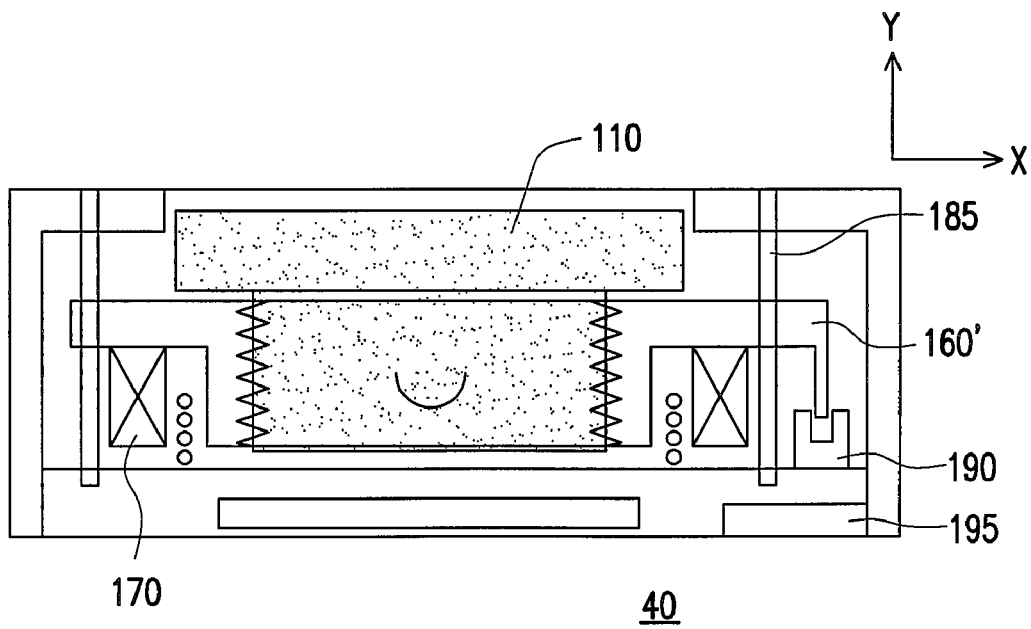
Figure 4:
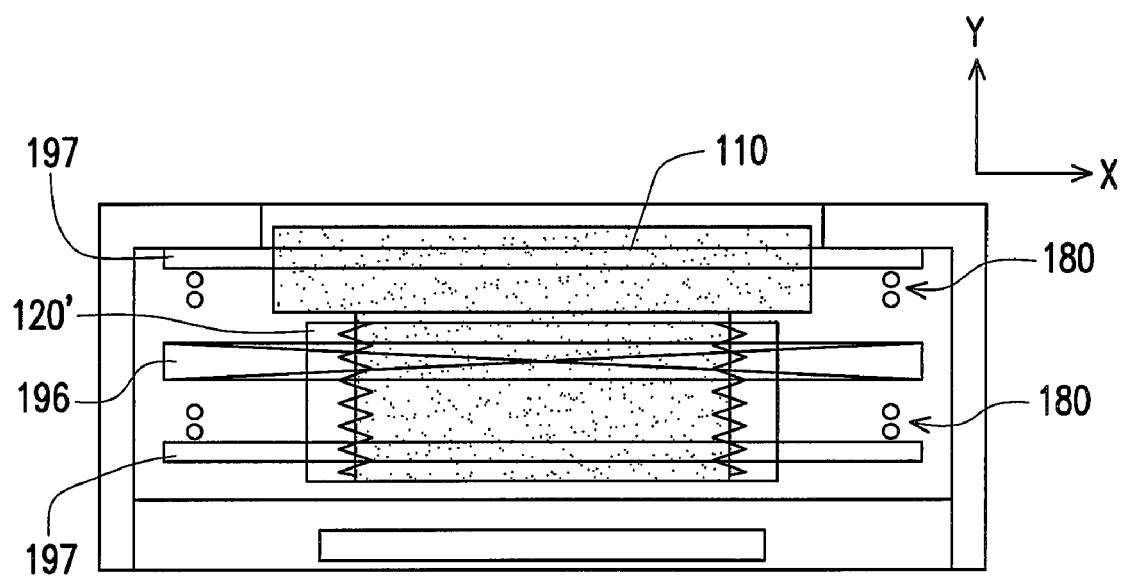
FIG. 4 is a schematic view of a conventional two-stage electromotive focus lens module.
Figure 5:
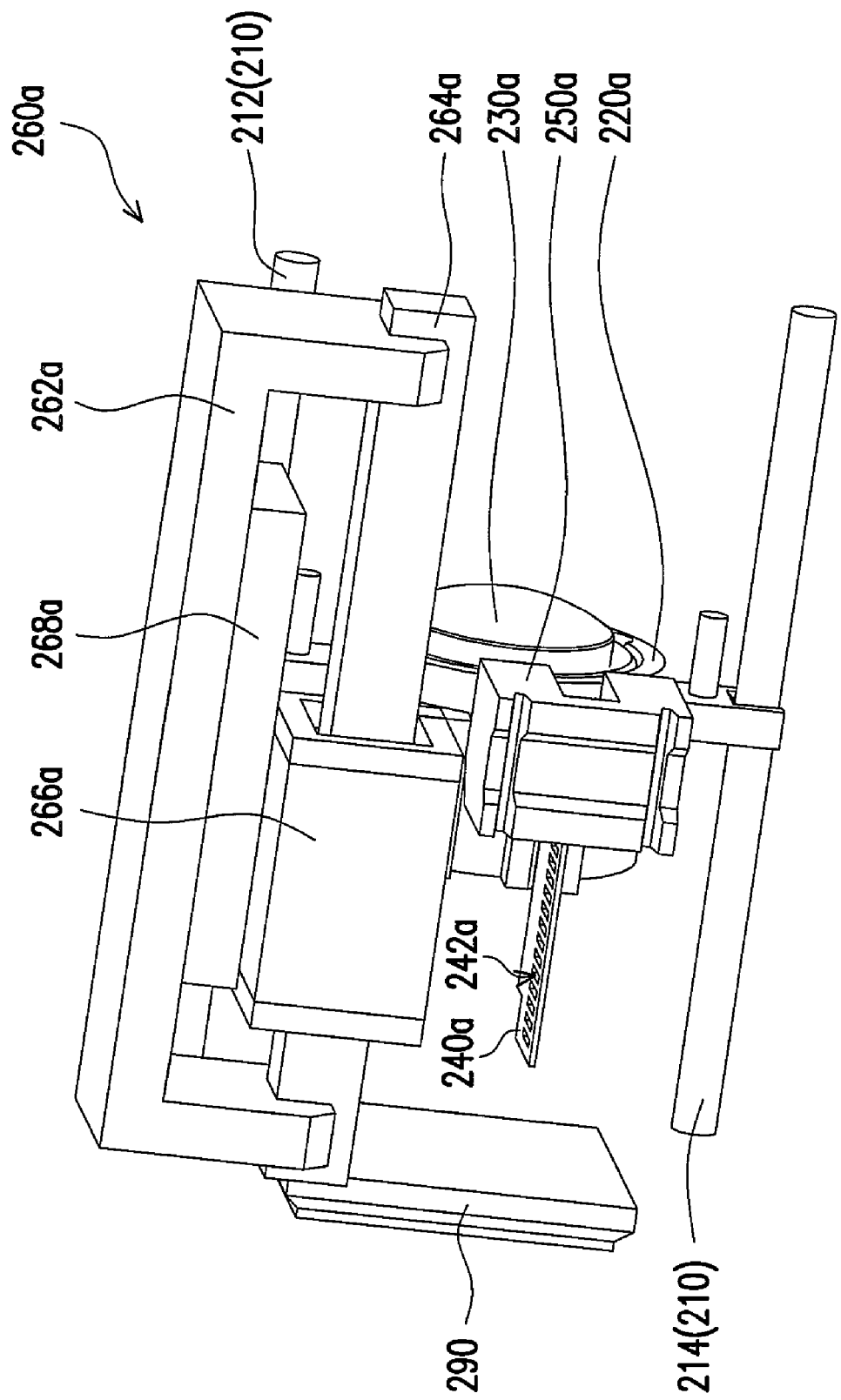
FIG. 5 is a stereogram of a lens module according to an embodiment of the present invention.

FIG. 5 is a stereogram of a lens module according to an embodiment of the present invention, FIG. 6A is an exploded view of the lens module of FIG. 5, and FIG. 6B is a schematic view of the first position sensor in FIG. 6A. Referring to FIGS. 5, 6A, and 6B, the lens module 200 of the present embodiment includes a guide rod set 210, a first lens barrel 220a, at least one first lens 230a, a first optical grating 240a, a first position sensor 250a, and a first voice coil motor 260a. The first lens barrel 220a is movably disposed on the guide rod set 210, the first lens 230a is disposed inside the first lens barrel 220a, and the first optical grating 240a is connected to the first lens barrel 220a. The first position sensor 250a and the first voice coil motor 260a are disposed near the first lens barrel 220a, wherein the first position sensor 250a has a first light-emitting device 252a and a first photosensor 254a opposite to the first light-emitting device 252a, and the first optical grating 240a is disposed between the first light-emitting device 252a and the first photosensor 254a. In addition, the first voice coil motor 260a includes a first base 262a, a first bar 264a, a first coil unit 266a, and a first magnet 268a. The first bar 264a is disposed on the first base 262a, and two ends of the first bar 264a are separated from the bottom of the first base 262a for a distance. The first coil unit 266a is connected to the first lens barrel 220a, the first bar 264a passes through the first coil unit 266a, and the first magnet 268a is disposed at the bottom of the first base 262a.

In the above lens module 200, the guide rod set 210 includes a first guide rod 212 and a second guide rod 214 substantially parallel to the first guide rod 212, and the first lens barrel 220a has two first connecting portions 222a, 224a jointed with the first guide rod 212 and the second guide rod 214. In addition, when a current is provided into the first coil unit 266a, the force-at-a-distance generated between the first coil unit 266a and the first magnet 268a urges the first coil unit 266a moving along the first bar 264a, so as to drive the first lens barrel 220a to move along the guide rod set 210. In other words, in the present embodiment, the moving distance and direction of the first lens barrel 220a on the guide rod set 210 can be controlled by changing the magnitude and direction of the current provided into the first coil 266a.

In view of the above, the first light-emitting device 252a is used to emit a first light ray towards the first photosensor 254a, and the first optical grating 240a has a plurality of first slits 242a for the first light ray to pass through. Herein, the first light-emitting device 252a is, for example, a light emitting diode, and the first photosensor 254a is, for example, a photodiode. In addition, the width of each of the first slits 242a is the same as the distance between any two adjacent first slits 242a. In an embodiment, the width of each first slit 242a is, for example, 0.15 mm.

Figure 7:
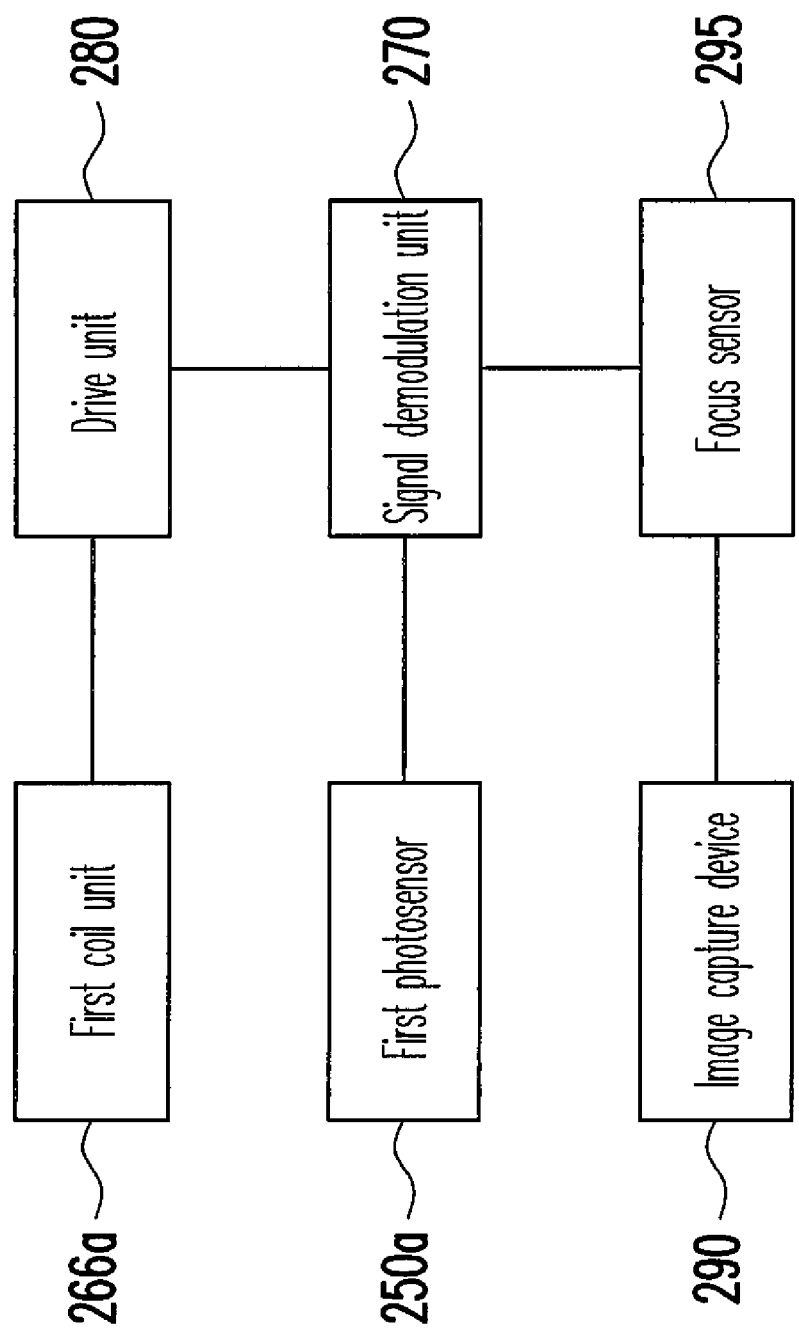
FIG. 7 is a schematic view of the drive circuit of the lens module of FIG. 5.

FIG. 7 is a schematic view of the drive circuit of the lens module of FIG. 5. Referring to FIG. 5 to FIG. 7, as the first optical grating 240a is connected to the first lens barrel 220a, when the first lens barrel 220a moves, the first optical grating 240a also moves accordingly, and when the first optical grating 240a moves, the first photosensor 254a discontinuously senses the first light ray passing through the first slits 242a. Thus, the moving distance of the first lens barrel 220a can be determined. More particularly, the lens module 200 further includes a signal demodulation unit 270 and a drive unit 280. The signal demodulation unit 270 is electrically connected to the first photosensor 254a, and the drive unit 280 is electrically connected to the first coil unit 266a and the signal demodulation unit 270. The signal demodulation unit 270 includes an A/D converter and a microcomputer. The A/D converter is used to convert an analog signal sensed by the first photosensor 254a into a digital signal, and the microcomputer is used to calculate the moving distance of the first lens barrel 220a according to the digital signal, so as to determine the position of the first lens barrel 220a, and output a first position control signal to the drive unit 280. In addition, the drive unit 280 is used to control the magnitude and direction of the current provided into the first coil unit 266a according to the first position control signal, so as to move the first lens barrel 220a to the desired position, thereby achieving the purpose of zooming.

In an embodiment, the lens module 200 further includes an image capture device 290 and a focus determining unit 295, wherein the focus determining unit 295 is electrically connected to the image capture device 290 and the drive unit 280. The image capture device 290 is disposed behind the first lens barrel 220a, and the first lens 230a is used to focus an image on the image capture device 290. The image capture device 290 is used to output an image signal, and the focus determining unit 295 is used to output a second position control signal according to the image signal. The drive unit 280 is used to control the magnitude and direction of the current provided into the first coil unit 266a according to the second position control signal, so as to adjust the position of the first lens barrel 220a, thereby achieving the purpose of precise focusing.

In the present embodiment, the position of the first lens barrel 220a is determined by the first optical grating 240a together with the first position sensor 250a, so that a high precision can be achieved, and the first lens barrel 220a can achieve the multi-stop positioning in the travel. Therefore, a long, middle, and short distance shooting can be achieved. In addition, the lens module 200 also has the advantages such as high magnetic circuit efficiency, small volume, low cost, low start current, and low noise.

Figure 8:
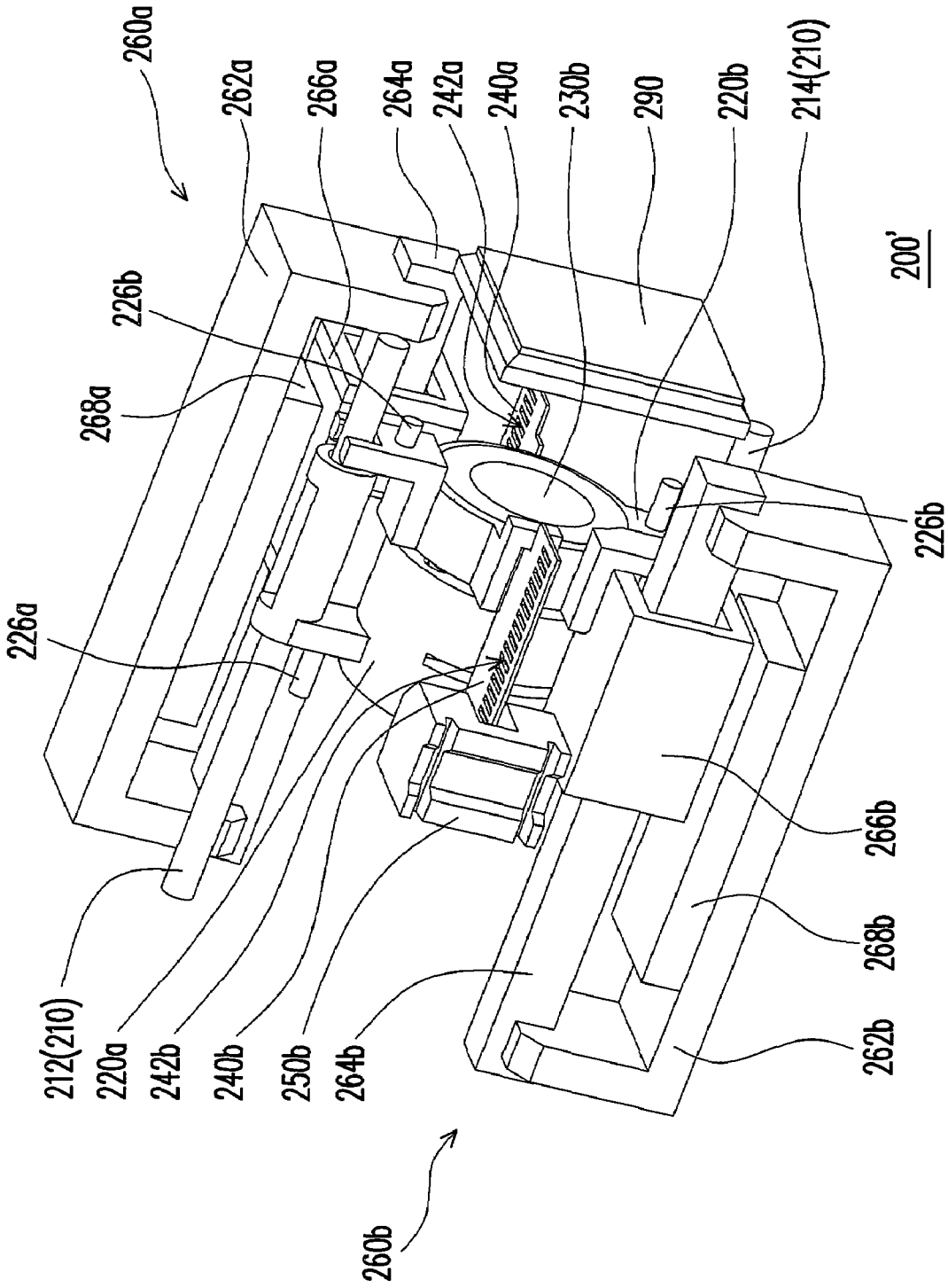
FIG. 8 is a stereogram of a lens module according to an embodiment of the present invention.
Figure 9A:
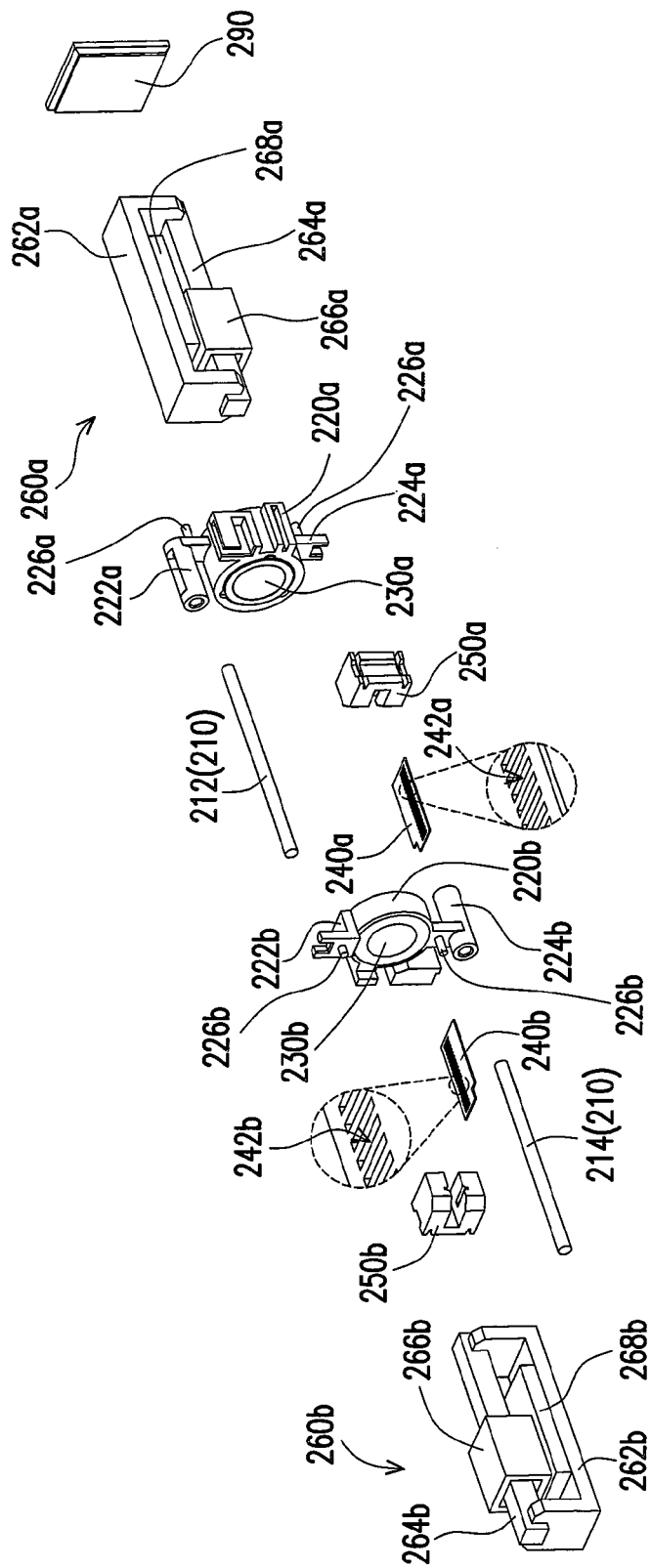
FIG. 9A is an exploded view of the lens module of FIG. 8.
Figure 9B:
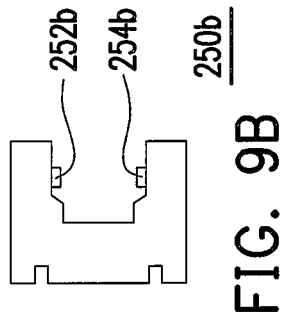
FIG. 9B is a schematic view of the second position sensor in FIG. 9A.

FIG. 8 is a stereogram of a lens module according to an embodiment of the present invention, FIG. 9A is an exploded view of the lens module of FIG. 8, and FIG. 9B is a schematic view of the second position sensor in FIG. 9A. Referring to FIGS. 8, 9A, and 9B, the lens module 200' of the present embodiment is similar to the lens module 200 of FIG. 5, and only the difference is described herein. The lens module 200' further includes a second lens barrel 220b, at least one second lens 230b, a second optical grating 240b, a second position sensor 250b, and a second voice coil motor 260b. The second lens barrel 220b is movably disposed on the guide rod set 210 and behind the first lens barrel 220a. The second lens 230b is disposed inside the second lens barrel 220b, and the second optical grating 240b is connected to the second lens barrel 220b. The second position sensor 250b and the second voice coil motor 260b are disposed near the second lens barrel 220b, wherein the second position sensor 250b has a second light-emitting device 252b and a second photosensor 254b opposite to the second light-emitting device 252b, and the second optical grating 240b is disposed between the second light-emitting device 252b and the second photosensor 254b. In addition, the second voice coil motor 260b includes a second base 262b, a second bar 264b, a second coil unit 266b, and a second magnet 268b. The second bar 264b is disposed on the second base 262b, and the two ends of the second bar 264b are separated from the bottom of the second base 262b for a distance. The second coil unit 266b is connected with the second lens barrel 220b, the second bar 264b passes through the second coil unit 266b, and the second magnet 268b is disposed at the bottom of the second base 262b.

The second lens barrel 220b has two second connecting portions 222b, 224b jointed with the first guide rod 212 and the second guide rod 214. When a current is provided into the second coil unit 266b, the force-at-a-distance generated between the second coil unit 266b and the second magnet 268b urges the second coil unit 266b move along the second bar 264b, so as to drive the second lens barrel 220b to move along the guide rod set 210. In other words, in the lens module 200', the moving distance and direction of the second lens barrel 220b on the guide rod set 210 can be controlled by changing the magnitude and direction of the current provided into the second coil 266b.

In view of the above, the second light-emitting device 252b is used to emit a second light ray towards the second photosensor 254b, and the second optical grating 240b has a plurality of second slits 242b for the second light ray to pass through. Herein, the second light-emitting device 252b is, for example, a light emitting diode, and the second photosensor 254b is, for example, a photodiode. In addition, the width of each of the second slit 242b is the same as the distance between any two adjacent second slits 242b. In an embodiment, the width of each second slit 242b is, for example, 0.15 mm.

Figure 10:
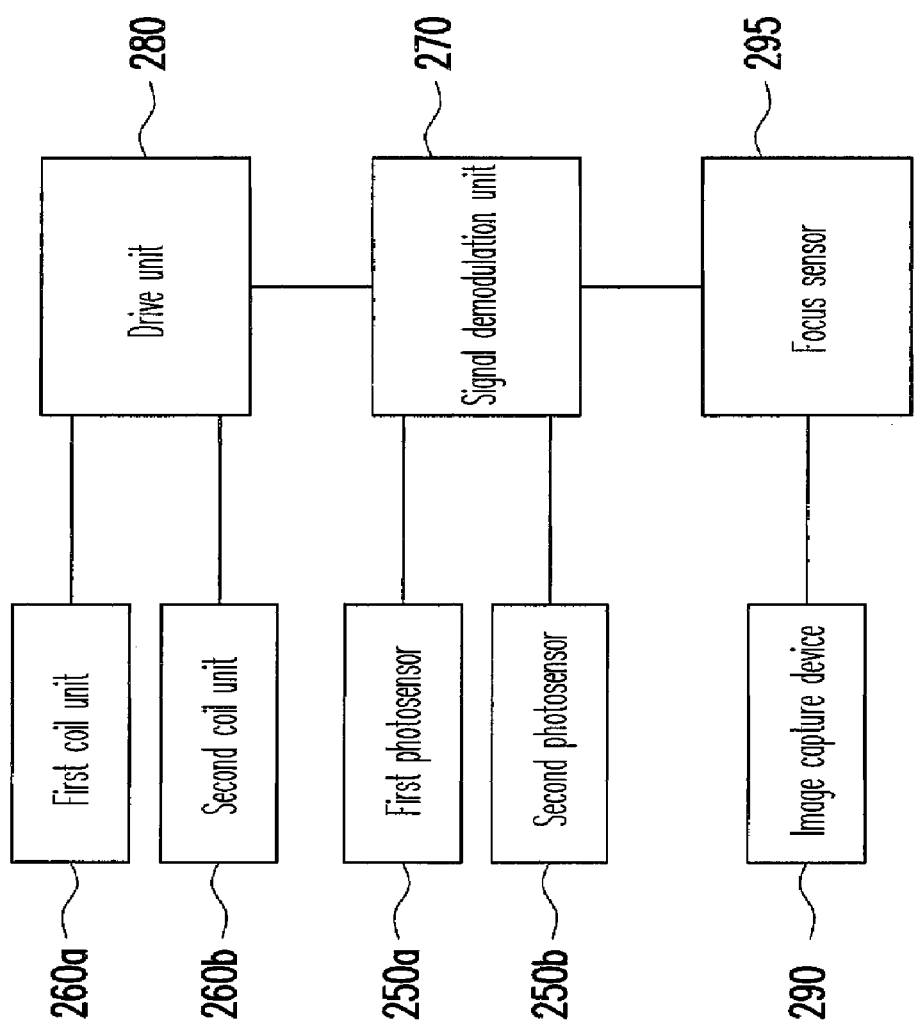
FIG. 10 is a schematic view of the drive circuit of the lens module of FIG. 8.

FIG. 10 is a schematic view of the drive circuit of the lens module of FIG. 8. Referring to FIG. 8 to FIG. 10, as the second optical grating 240b is connected to the second lens barrel 220b, when the second lens barrel 220b moves, the second optical grating 240b moves accordingly, and when the second optical grating 240b moves, the second photosensor 254b discontinuously senses the second light ray passing through the second slits 242b. Thus, the moving distance of the second lens barrel 220b can be determined. More particularly, the signal demodulation unit 270 of the lens module 200', in addition to being electrically connected to the first photosensor 254a, is electrically connected to the second photosensor 254b. The drive unit 280, in addition to being electrically connected to the first coil unit 266a and the signal demodulation unit 270, is electrically connected to the second coil unit 266b. The A/D converter of the signal demodulation unit 270 is used to convert analog signals sensed by the first photosensor 254a and the second photosensor 254b into digital signals. The microcomputer is used to calculate the moving distance of the first lens barrel 220a and the second lens barrel 220b according to the digital signals, so as to determine the positions of the first lens barrel 220a and the second lens barrel 220b and output a first position control signal to the drive unit 280. In addition, the drive unit 280 is used to control the magnitude and direction of the currents provided into the first coil unit 266a and the second coil unit 266b according to the first position control signal, so as to move the first lens barrel 220a and the second lens barrel 220b to the desired positions, thereby achieving the purpose of zooming.

In an embodiment, the magnification of the lens module 200' can be changed by moving the first lens barrel 220a, and optical compensation can be achieved by moving the second lens barrel 220b. In addition, the image capture device 290 of the lens module 200' is disposed behind the second lens barrel 220b, i.e., the second lens barrel 220b is disposed between the image capture device 290 and the first lens barrel 220a. The first lens 230a and the second lens 230b are used to focus an image on the image capture device 290, the image capture device 290 is used to output an image signal, and the focus determining unit 295 is used to output a second position control signal according to the image signal. The drive unit 280 is used to control the magnitude and direction of the currents provided into the first coil unit 266a and the second coil unit 266b according to the second position control signal, so as to adjust the positions of the first lens barrel 220a and the second lens barrel 220b, thereby achieving the purpose of precise focus.

It should be noted that the end of the first lens barrel 220a away from the second lens barrel 220b can have at least one first stop pin 226a, and the end of the second lens barrel 220b away from the first lens barrel 220a can have at least one second stop pin 226b, such that the first lens barrel 220a and the second lens barrel 220b when keeping still are attached to a main structure of the lens module 200'.

To sum up, the lens module of the present invention at least has one or more of the following advantages.

1. The position of the lens barrel is determined by the optical grating together with the position sensor, a high precision may be achieved, and the lens barrel can achieve a multi-stop positioning in the travel. Therefore, a long, middle and short distance shooting can be achieved.

2. The lens module of the present invention has the advantages such as high magnetic circuit efficiency, small volume, low cost, low start current, and low noise.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A lens module, comprising:
   a guide rod set;
   a first lens barrel, movably disposed on the guide rod set;
   at least one first lens, disposed inside the first lens barrel;
   a first optical grating, connected to the first lens barrel;
   a first position sensor, disposed near the first lens barrel, wherein the first position sensor comprises a first light-emitting device and a first photosensor opposite to the first light-emitting device, and the first optical grating is disposed between the first light-emitting device and the first photosensor; and
   a first voice coil motor, disposed near the first lens barrel, the first voice coil motor comprising:
      a first base;
      a first bar, disposed on the first base, wherein two ends of the first bar are separated from the bottom of the first base for a distance;
      a first coil unit, connected to the first lens barrel, wherein the first bar passes through the first coil unit; and
      a first magnet, disposed at the bottom of the first base,
   wherein when a current is provided into the first coil unit, the force-at-a-distance generated between the first coil unit and the first magnet urges the first coil unit moving along the first bar, so as to drive the first lens barrel to move along the guide rod set.

2. The lens module as claimed in claim 1, wherein the first light-emitting device is used to emit a first light ray towards the first photosensor, the first optical grating comprises a plurality of first slits for the first light ray to pass through, and when the first lens barrel moves, the first photosensor discontinuously senses the first light ray passing through the first optical grating.

3. The lens module as claimed in claim 1, wherein the guide rod set comprises a first guide rod and a second guide rod substantially parallel to the first guide rod, and the first lens barrel comprises two first connecting portions jointed with the first guide rod and the second guide rod.

4. The lens module as claimed in claim 1, further comprising:
   a signal demodulation unit, electrically connected to the first photosensor, wherein the signal demodulation unit is used to determine the position of the first lens barrel according to the signal sensed by the first photosensor, and output a first position control signal; and
   a drive unit, electrically connected to the first coil unit and the signal demodulation unit, wherein the drive unit is used to control the current provided into the first coil unit according to the first position control signal.

5. The lens module as claimed in claim 4, further comprising:
   an image capture device, disposed behind the first lens barrel, wherein the first lens is used to focus an image on the image capture device, and the image capture device is used to output an image signal; and
   a focus determining unit, electrically connected to the image capture device and the drive unit, wherein the focus determining unit is used to output a second position control signal according to the image signal, and the drive unit is used to control the current provided into the first coil unit according to the second position control signal.

6. The lens module as claimed in claim 1, further comprising:
   a second lens barrel, movably disposed on the guide rod set and behind the first lens barrel;
   at least one second lens, disposed inside the second lens barrel;
   a second optical grating, connected to the second lens barrel;
   a second position sensor, disposed near the second lens barrel, wherein the second position sensor comprises a second light-emitting device and a second photosensor opposite to the second light-emitting device, and the second optical grating is disposed between the second light-emitting device and the second photosensor; and a second voice coil motor, disposed near the second lens barrel, the second voice coil motor comprising:
  a second base;
  a second bar, disposed on the second base, wherein two ends of the second bar are separated from the bottom of the second base for a distance;
  a second coil unit, connected to the second lens barrel, wherein the second bar passes through the second coil unit; and
  a second magnet, disposed at the bottom of the second base,
  wherein when a current is provided into the second coil unit, the force-at-a-distance generated between the second coil unit and the second magnet urges the second coil unit moving along the second bar, so as to drive the second lens barrel to move along the guide rod set.

7. The lens module as claimed in claim 6, wherein the second light-emitting device is used to emit a second light ray towards the second photosensor, the second optical grating comprises a plurality of second slits for the second light ray to pass through, and when the second lens barrel moves, the second photosensor discontinuously senses the second light ray passing through the second optical grating.

8. The lens module as claimed in claim 6, further comprising:
  a signal demodulation unit, electrically connected to the first photosensor and the second photosensor, wherein the signal demodulation unit is used to determine the positions of the first lens barrel and the second lens barrel according to the signals sensed by the first photosensor and the second photosensor, and output a first position control signal; and
  a drive unit, electrically connected to the first coil unit, the second coil unit, and the signal demodulation unit, wherein the drive unit is used to control the currents provided into the first coil unit and the second coil unit according to the first position control signal.

9. The lens module as claimed in claim 8, further comprising:
  an image capture device, disposed behind the second lens barrel which is disposed between the image capture device and the first lens barrel, wherein the first lens and the second lens are used to focus an image on the image capture device, and the image capture device is used to output an image signal; and
  a focus determining unit, electrically connected to the image capture device and the drive unit, wherein the focus determining unit is used to output a second position control signal according to the image signal, and the drive unit is used to control the currents provided into the first coil unit and the second coil unit according to the second position control signal.

10. The lens module as claimed in claim 6, wherein the guide rod set comprises a first guide rod and a second guide rod substantially parallel to the first guide rod, the first lens barrel comprises two first connecting portions jointed with the first guide rod and the second guide rod, and the second lens barrel comprises two second connecting portions jointed with the first guide rod and the second guide rod.

11. The lens module as claimed in claim 6, wherein the end of the first lens barrel away from the second lens barrel comprises at least one first stop pin, and the end of the second lens barrel away from the first lens barrel comprises at least one second stop pin.

* * * * *